United States Patent [19]

McAninch et al.

[11] Patent Number: 5,221,045
[45] Date of Patent: Jun. 22, 1993

[54] BULGE FORMED COOLING CHANNELS WITH A VARIABLE LEAD HELIX ON A HOLLOW BODY OF REVOLUTION

[75] Inventors: Michael D. McAninch, Hilliard; Richard L. Holbrook, Louisville; Dale F. Lacount, Alliance, all of Ohio; Chester M. Kawashige, Roseville, Calif.; John M. Crapuchettes, Cameron Park, Calif.; James Scala, Ranco Cordova, Calif.

[73] Assignee: The Babcock & Wilcox Company, New Orleans, La.

[21] Appl. No.: 764,029

[22] Filed: Sep. 23, 1991

[51] Int. Cl.$^5$ .......................................... B64D 33/04
[52] U.S. Cl. ...................................... 239/1; 239/127.1; 239/127.3; 60/267; 29/890.01; 29/890.042
[58] Field of Search .............. 239/1, 13, 127.1, 127.3; 60/266, 267; 228/157; 29/890.042, 890.142, 890.01

[56] References Cited

U.S. PATENT DOCUMENTS

| | | | |
|---|---|---|---|
| 3,127,737 | 4/1964 | Ledwith | 60/266 |
| 3,235,947 | 2/1966 | Sohlemann | 60/267 |
| 3,249,989 | 5/1966 | Robinson | 29/890.01 |
| 3,267,664 | 8/1966 | Jones et al. | 60/267 |
| 3,538,577 | 11/1970 | O'Malley | 29/890.042 |

*Primary Examiner*—Andres Kashnikow
*Assistant Examiner*—Karen B. Merritt
*Attorney, Agent, or Firm*—Vytas R. Matas; Robert J. Edwards; Daniel S. Kalka

[57] ABSTRACT

A method of constructing a nozzle having cooling channels comprises a shell and a liner which are formed into a body of revolution having an axis of revolution. Helical welds are formed to hold the liner and shell to each other with a channel position being defined between each pair of helical welds. Pressurized fluid which may be a gas or a liquid, is introduced between the weld pairs to outwardly bulge the material of at least one of the liner and shell to define the channels.

16 Claims, 4 Drawing Sheets

BULGE FORMED COOLING CHANNELS WITH A VARIABLE LEAD HELIX ON A HOLLOW BODY OF REVOLUTION

This invention was made with government support under Contract No. NAS8-38080, Subcontract No. L823626H, awarded by the National Aeronautics & Space Administration (NASA). The government has certain rights in this invention.

FIELD AND BACKGROUND OF THE INVENTION

The present invention relates in general to the construction of auxiliary cooled nozzles, and in particular to a new and useful method of constructing a hollow body of revolution on which is particularly useful as a rocket nozzle.

A rocket nozzle may be approximated by a thin-walled shell of revolution having the shape of a conic section (ellipse, parabola or hyperbola). The shape directly effects the performance of the rocket engine by directing the engine exhaust gases. Nozzles are either uncooled or auxiliary cooled to survive the operating temperatures of the engine, where the design is dependent upon the material used. In general, uncooled rocket nozzles are made from refractory alloys such as columbium. Auxiliary cooled nozzles are produced from lower cost, lower melting point materials such as nickel/cobalt-base alloys. Survival of these nozzles is dependent upon the presence of auxiliary coolant, which may include liquid hydrogen fuel or engine exhaust gases.

Auxiliary cooling is provided by attaching individual lengths of tubing on the inside surface of the nozzle. These tubes must be positioned parallel to the axis of rotation for the nozzle so as not to create turbulence in the engine exhaust gases. This would lower performance and create potential instabilities. The tubes are attached to the surface of the nozzle by furnace brazing, where brazing foil is attached to the nozzle surface prior to inserting the tubes. This operation generally requires a number of subsequent brazing operations to achieve complete bonding at the interface. These brazing operations are performed in an atmospherically controlled furnace to prevent oxidation, and therefore are quite costly and labor intensive. Depending on the size of the given nozzle, the number of tubes required can exceed several hundred.

The geometry of the each tube is such that it must conform to the conical or parabolic shape of the nozzle, thus requiring custom forming. Additionally, the entire inside surface of the nozzle must be covered to prevent "hot spots" which could result in premature failure of the nozzle. Each nozzle has an aspect ratio from the aft or large outlet end of the nozzle to the forward or small inlet end of the nozzle. Typical aspect ratios range from 2:1 to 3:1. Since there are no intermediate manifolding techniques for the tubes, this requires the same number of tubes at both ends of the nozzle. Therefore, to completely cover the nozzle surface, requires each tube to have a custom shape, which must change along its length, and is directly related to the aspect ratio of the nozzle. This can be in the form of increasing diameter (forward to aft) at a rate equal to the aspect ratio, or by changing the shape of the tube (e.g. making it oval) as it approaches the forward end of the nozzle. The first method results in a tube having an increasing flow area along the length of the nozzle, which can be undesirable for efficient cooling. The second approach is more ideal, where a constant perimeter is maintained by altering the tube geometry. In either case, the tubing is quite expensive.

At the forward end of the nozzle, the tubes are attached to a manifold to allow the auxiliary coolant to flow through the tube passages. The aft end of the channel can be designed to recirculate the coolant back up the nozzle wall, or to vent the coolant to either the atmosphere or the engine exhaust.

SUMMARY OF THE INVENTION

According to the present invention, bulge forming is used instead of tubing to create the cooling passages on rocket nozzles. The auxiliary cooled nozzle is produced from essentially two pieces of sheet material which are formed to the desired nozzle contour (conical, parabolic, etc). One piece represents the shell, providing the structural integrity of the nozzle, while the second sheet (or liner) is used to produce the desired cooling passages. The liner can be placed on the inside or outside of the shell. Thus the bulge forming process provides a high degree of flexibility for the placement of coolant channels, where they can be on the inside surface of the nozzle (similar to conventional cooling techniques using tubes), on the outside surface of the nozzle, or combinations of both.

Accordingly, an object of the present invention is to provide a method of constructing a nozzle with cooling channels, which comprises: attaching a liner material to a shell material at a plurality of spaced apart welds to define a plurality of channel positions between each pair of adjacent welds and between the liner and shell materials and introducing a pressurized fluid or gas media between the liner and shell materials at each channel position, under sufficient pressure to outwardly bulge either (or both) the liner and shell materials to form a cooling channel at each channel position.

A further object of the present invention is to provide a nozzle which is constructed according to the method of the invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
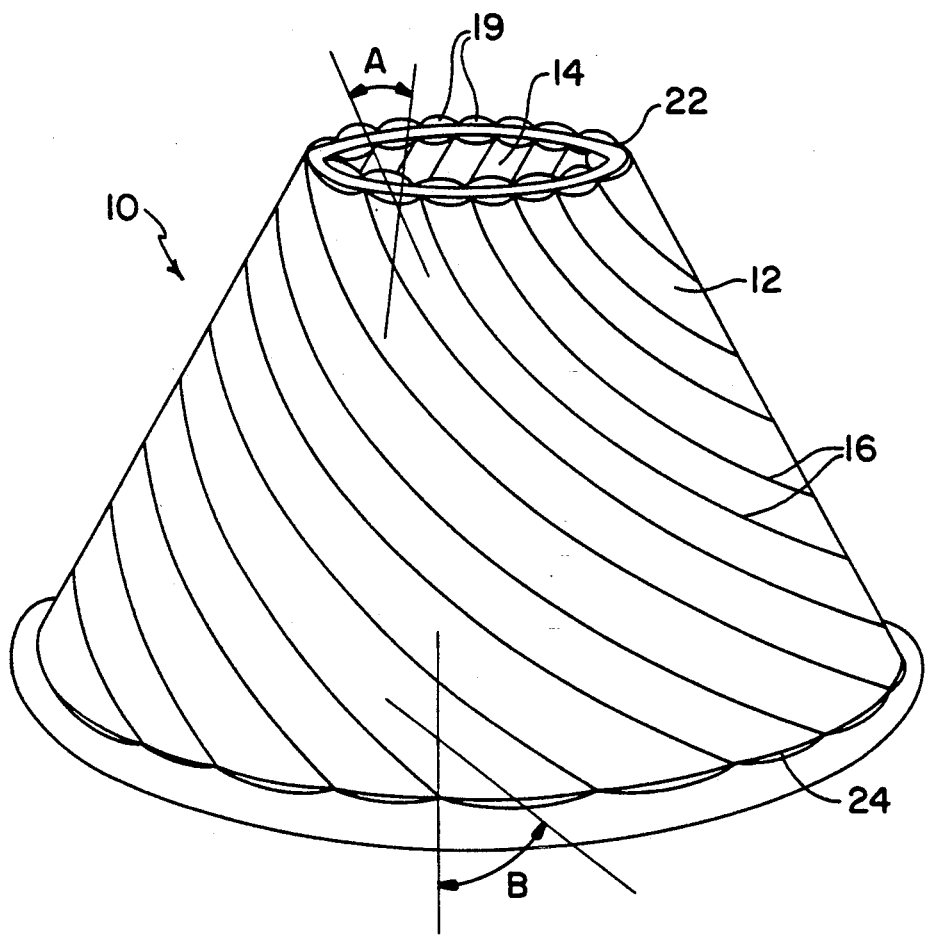
FIG. 1 is a perspective view of a nozzle with cooling channels constructed in accordance with the present invention.

Referring to the drawings in particular, the invention embodied in FIG. 1 comprises a method of constructing a nozzle 10 which is advantageously a rocket nozzle, having variable lead, helical cooling channels 19 formed between a shell 12 and a liner 14 of the nozzle which are formed of respective shell and liner materials.

Figure 2:
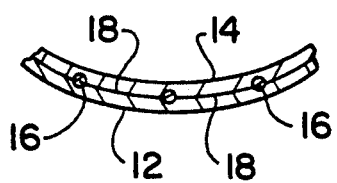
FIG. 2 is a partial sectional view of the nozzle in FIG. 1, before the cooling channels are formed.

As shown in FIG. 2, the sheet material of shell 12 and liner 14 are assembled together to provide intimate contact at their interfaces. A series of continuous welds 16 are made to join the liner 14 and the shell 12 together, where the spacing between adjacent pairs of welds represents the desired channel position and size 18. Welding can be done from either the inside or outside of the nozzle, which is only limited be the equipment size. A variety of welding processes can be used such as electron beam, laser beam, resistance, and ultrasonic welding. Electron beam welds have been demonstrated as being useful, in particular.

Additional welds are made to temporarily seal the ends of the liner and shell together at forward end 22 and aft end 24 as shown in FIG. 1.

Figure 3:
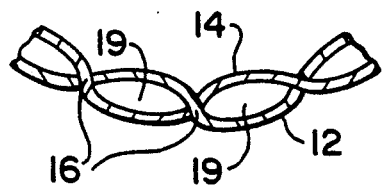
FIG. 3 is a view similar to FIG. 1, after the cooling channels have been formed.

The interface of the shell and liner at 18, between each adjacent pair of welds, is pressurized, separating the two materials to create the desired coolant passage or channel 19 in FIG. 3. Pressurization can be done with a variety of media including a gas or a liquid. Additionally, each channel 19 can be expanded individually or a manifolding device can be used to expand all of the channels simultaneously, thus simplifying the manufacturing process. Sufficient pressure is used to outwardly bulge the material of the liner, the shell, or both.

After expansion of all the channels the forward end 22 of the nozzle 10 is attached to a manifold which injects coolant into the passages during the operation of the rocket engine. Depending upon the design, the same manifold can be used for the expansion operation. The aft end 24 of the channels are constructed to vent either to the atmosphere or into the exhaust of the engine. Additionally, the design could be such that the coolant is recirculated.

The expansion process can be done at low or elevated temperatures. As the temperature is increased, the required pressure to produce the same channel area decreases. This technique of expansion can be used as a "proof test" during manufacturing to significantly reduce the required inspection. The temperature and pressure can be selected to meet or exceed those foreseen during service. Therefore, the expansion process demonstrates the integrity of the channels. Additionally, the expansion of the channel results from yielding (or stretching) of either the liner material only or both the liner and the shell depending upon the ratio of the material thicknesses This provides an added method of control for area.

Figure 4:
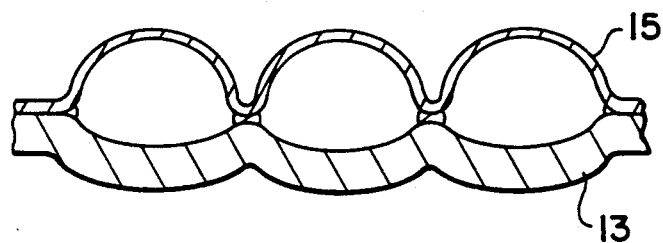
FIG. 4 is a partial sectional view of another embodiment of the invention showing the use of materials having different thicknesses to form the liner and shell of the nozzle.

One of the distinct advantages of bulge forming over conventional tubing is that the channel area can be easily controlled as desired. Thus, it provides an extremely flexible manufacturing process, where increased or decreased flow area can be produced at desired locations. Several techniques have been demonstrated for channel area control. FIG. 4 illustrates an example where the shell 13 is of thicker material than the liner 15, which thus bulges more.

The first method thus involves varying the thickness of the liner material. Decreasing the thickness (for a constant channel spacing) will increase the area because the bulge forming technique relies on the yielding of the material. Therefore, for those regions where the thickness has been reduced, increased yielding will occur. This can be quite localized, if desired. Methods to vary the material thickness would include processes such as chemical milling.

Figure 5:
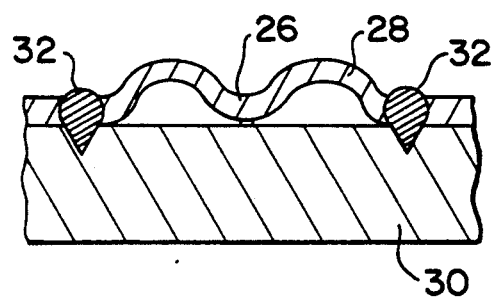
FIG. 5 is a partial sectional view showing a further embodiment of the invention in a pre-bulged condition.
Figure 6:
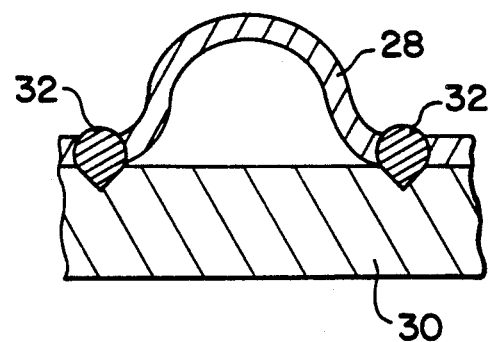
FIG. 6 is a view similar to FIG. 5 in a post-bulged condition.

The second method of varying the channel area, as shown in FIGS. 5 and 6, is to form a convolution 26 in the liner material 28 prior to welding to a shell 30 at 32. One or more convolution is positioned such that it is in between adjacent welds 32. During expansion the convolution is popped or snapped out thereby increasing the area as shown in FIG. 6. The convolution can be localized or extend the entire length of the channel.

Figure 7:
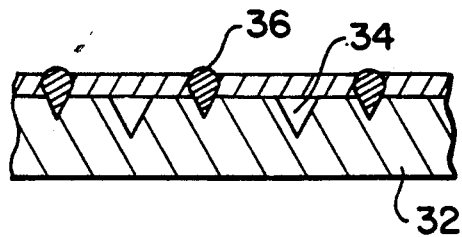
FIG. 7 is a partial sectional view of a liner and shell illustrating another embodiment of the invention.

A third approach is somewhat similar to convoluting, and involves machining the shell 32 in the regions 34 between the adjacent welds 36 as shown in FIG. 7. These machined pockets or scallops provide increased channel area, and can be either localized or run continuously along the channel. Additionally, various combinations of convoluting and machining can also be used.

Figure 8:
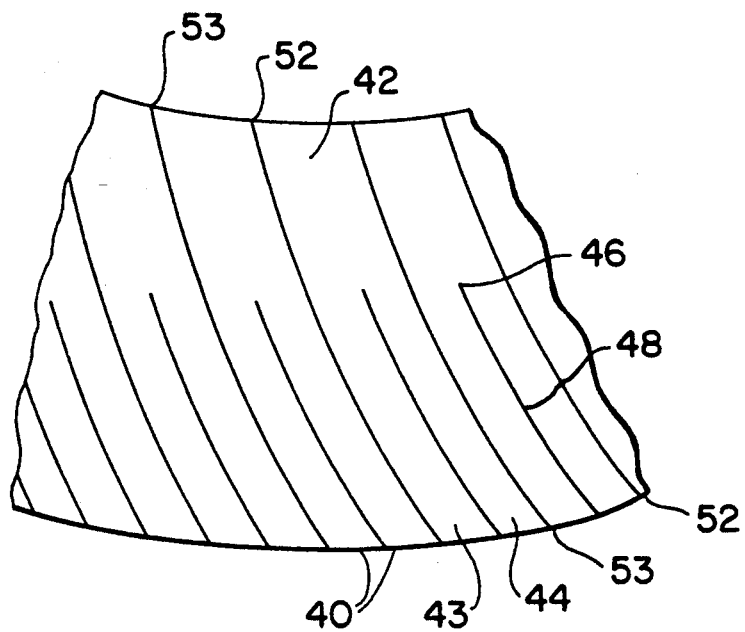
FIG. 8 is a partial plan view of a nozzle wall constructed in accordance with another embodiment of the invention.

The fourth approach, shown in FIG. 8, is to utilize bifurcated channels 40 where a given channel 42 is split into two separate channels 43, 44 at some point along its length. Using conventional tubing would require three separate pieces, where an intricate manifold union would be required to attached the tubes. However, using bulge forming a bifurcated channel can easily be produced. At some desired point 46 along the length of the nozzle, an intermediate weld 48 is made between two previously adjacent weld segments 52, 53. After expansion, the bifurcated channel 40 begins at the point 46 where the intermediate weld 48 initiates.

A unique advantage of the bulge forming process is the ability to place the coolant channels on the outside surface of the nozzle. Added flexibility is provided since the channels must no longer be axial to prevent turbulence of the engine exhaust gases. A spiral channel design has been demonstrated where a robotic welding system is used to produce the continuous welds along a nonlinear path according to the invention. A distinct advantage offered by this approach is that it allows for the channel area to remain constant along the nozzle length, which provides increased cooling capacity. To compensate for the aspect ratio of the nozzle, the helix angle for the weld relative to the revolution axis of the nozzle is varied accordingly. At the forward end of the nozzle where the diameter is small, the helix angle A as shown in FIG. 1 is also small. As the welds are made along the nozzle length the diameter increases and thus, so does the helix angle up to angle B at aft end 24, to maintain a constant channel area.

The mathematical model utilized for calculating and thereafter executing the variable lead helix for each channel of the nozzle is as follows:

Geometry

ANGCD = CONE HALF ANGLE
ANGBD = BLANK ANGLE
or helix on cone surface
N = NUMBER OF CHANNELS
W = CHANNEL SPACE OR WIDTH
ANGD = HELIX ANGLE FROM RADIAL ON THE CONE SURFACE.

ANGX denotes angle in radions. ANGXD denotes angle in degrees. Coordinates on the blank surface are R = RADIUS, AND PHI = ANGLE.

ANGCD : =30

Figure 9:
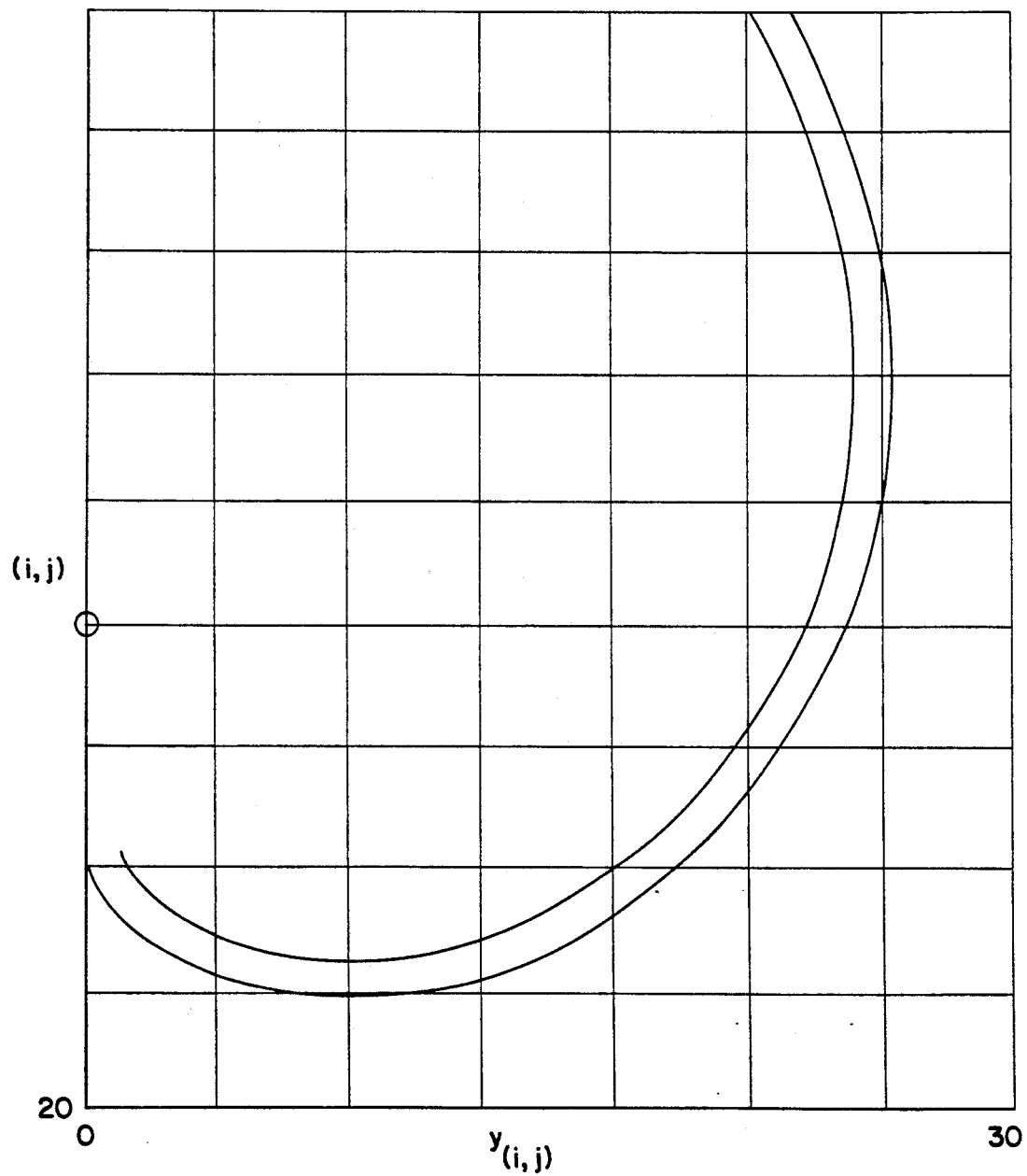
FIG. 9 is a graph plotting the x and y coordinate positions of a weld pair on the surface, illustrating the changing helix angle which is advantageously utilized for producing helical cooling channels in accordance with the present invention.

$ANGCD: = 30$
$ANGC: = ANGCD \, \pi/180$  $\quad ANGC = 0.524$
$ANGB: = 2\pi \sin(ANGC)$  $\quad ANGB = 3.142$ $ANGBD: = 180 \frac{ANGB}{\pi}$  $\quad ANGBD = 180$ $N: = 22$
$NN: = 1$  $\quad W: = 1.38$
$i: = 0 \ldots NN$ (Helix Number)
$n: = 1500$ (Points on Helix to Plot)
$j: = 0 \ldots n$ $R_j: = N \frac{W}{ANGB} + .000001 + .025 \, j \quad R_o = 9.664 \quad R_n = 47.164$ $U_j: = \sqrt{\left[\frac{ANGB}{NW}\right]^2 R_j^2 - 1} \quad U_o = 0$ $PHIO_i: = \frac{ANGB}{N} \cdot i \quad PHIO_1 = 0.143$ $PHI1_{i,j}: = U_j - \mathrm{atan}[U_j] + PHIO_i$
$x_{i,j}: = R_j \cos[PHI1_{i,j}] \quad x_{0,0} = 9.664 \quad x_{NN,n} = -43.186$
$Y_{i,j}: = R_j \sin[PHI1_{i,j}] \quad y_{0,0} = 0 \quad y_{NN,n} = -18.958$ FIG. 9 illustrates a pair of weld lines on the blank surface which were calculated using the foregoing and which produced suitably varied lead angles for the helical paths of each coolant channel.

Advantages of the invention include:

Cost Reduction;
  uses relatively inexpensive sheet material as compared to custom formed tubing.
  does not require labor intensive and costly furnace brazing procedures to attach the channels. The welding operation (electron beam laser beam, etc.) can be easily automated, providing significantly reduced manufacturing times.
  reduces the number of parts required to essentially two (shell and liner), while the conventional approach typically requires several hundred pieces of tubing, depending upon the specific nozzle size.
  all channels can be expanded simultaneously, from a single manifolding system, which may be a part of the coolant flow manifold.

Design Flexibility;
  allows for either (or both) internal and external cooling channels, where the flow area can be controlled by a number of methods, including; bifurcated channels, variable thickness materials, convoluted or scalloped channels.

Part Integrity;
  the bulge forming operation provides a "proof test" of the channel integrity, where the temperature and pressures used can well exceed those anticipated during service. Thus, minimizing the required inspection.

While specific embodiments of the invention have been shown and described in detail to illustrate the application of the principles of the invention, it will be understood that the invention may be embodied otherwise without departing from such principles.

What is claimed is:

1. A method of constructing a nozzle with cooling channels, comprising:
   attaching a liner material to a shell material at a plurality of spaced apart welds to define a plurality of channel positions between each pair of adjacent welds and between the liner and shell materials;
   forming the liner and shell material into a body of revolution having an axis of revolution, the welds each extending helically with respect to the axis of revolution, with each channel formed between a pair of adjacent helical welds having a lead helix angle which varies along the body of revolution in the direction of the axis of revolution; and
   introducing a pressurized fluid between the liner and shell materials at each channel position, under sufficient pressure to outwardly bulge at least one of the liner and shell materials to form a cooling channel at each channel position.

2. A method according to claim 1, wherein the body of revolution has a small diameter forward end and a larger diameter aft end, the lead helix angle being greater at the aft end then at the forward end.

3. A method according to claim 2, wherein the liner material has the same thickness as the shell material.

4. A method according to claim 2, wherein the liner material is thinner than the shell material.

5. A method according to claim 2, including providing at least one convolution in one of the liner and shell materials, between each pair of adjacent welds, so that, when the pressurized fluid is introduced, the one of the liner and shell material snaps out to form the cooling channel.

6. A method according to claim 2, including forming a pocket in at least one of the liner and shell materials, between each pair of adjacent welds to form at least part of the cooling channel between each pair of adjacent welds.

7. A method according to claim 2, including dividing at least one channel into a pair of channels by forming an additional weld between a pair of adjacent welds so that the cooling channel formed by the pair of adjacent welds and the additional weld is a divided channel.

8. A method according to channel 1, wherein the liner material has the same thickness as the shell material.

9. A method according to claim 1, wherein the liner material is thinner than the shell material.

10. A method according to claim 1, including providing at least one convolution in one of the liner and shell materials, between each pair of adjacent welds, so that, when the pressurized fluid is introduced, the one of the liner and shell material snaps out to form the cooling channel.

11. A method according to claim 1, including forming a machined pocket in at least one of the liner and shell materials, between each pair of adjacent welds to form at least part of the cooling channel between each pair of adjacent welds.

12. A method according to claim 1, including dividing at least one channel into a pair of channels by forming an additional weld between a pair of adjacent welds so that the cooling channel formed by the pair of adjacent welds and the additional weld is a divided channel.

13. A nozzle having a plurality of cooling channels, comprising:
   a liner material attached to a shell material at a plurality of spaced apart welds defining a plurality of channels between adjacent pairs of welds, each channel formed by an outward bulging of at least one of the liner and shell materials;
   said liner and shell materials being formed into a body of revolution having an axis of revolution with a small diameter end forming a forward end of the nozzle and a large diameter end forming an aft end of the nozzle, said channels extending in a helical path with respect to the axis of revolution and having a helix angle of each channel which varies along the axis of revolution.

14. A nozzle according to claim 13, wherein the helix angle is greater at the aft end and then at the forward end.

15. A nozzle according to claim 13, wherein the liner and shell materials have the same thickness.

16. A nozzle according to claim 13, wherein the liner and shell materials have different thicknesses.

* * * * *